(12) United States Patent
Borkar (10) Patent No.: US 11,710,127 B2
(45) Date of Patent: *Jul. 25, 2023

(54) SYSTEMS AND METHODS FOR USE IN AUTHENTICATING CONSUMERS IN CONNECTION WITH PAYMENT ACCOUNT TRANSACTIONS

(71) Applicant: MASTERCARD INTERNATIONAL INCORPORATED, Purchase, NY (US)

(72) Inventor: Vijaykumar Vamanrao Borkar, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/101,104

(22) Filed: Nov. 23, 2020

(65) Prior Publication Data

US 2021/0150529 A1 May 20, 2021

Related U.S. Application Data

(63) Continuation of application No. 15/240,201, filed on Aug. 18, 2016, now Pat. No. 10,846,697.

(51) Int. Cl.
*G06Q 20/40* (2012.01)
*G06Q 20/32* (2012.01)

(52) U.S. Cl.
CPC ....... *G06Q 20/4014* (2013.01); *G06Q 20/322* (2013.01); *G06Q 20/327* (2013.01); *G06Q 20/40145* (2013.01); *G06Q 20/326* (2020.05)

(58) Field of Classification Search
CPC .......................... G06Q 20/00; G06Q 20/4014
See application file for complete search history.

(56) References Cited

U.S. PATENT DOCUMENTS 7,500,616 B2 * 3/2009 Beenau ................. H04L 9/3273
235/382
8,761,809 B2 6/2014 Faith et al.
(Continued)

FOREIGN PATENT DOCUMENTS

EP 2631834 A1 8/2013
WO WO2015/058300 4/2015

OTHER PUBLICATIONS

Secure Remote Mobile Payment Architecture and Application IEEE (Year: 2010).*

(Continued)

*Primary Examiner* — Bruce I Ebersman
(74) *Attorney, Agent, or Firm* — Harness, Dickey & Pierce, P.L.C.

(57) ABSTRACT

Disclosed are exemplary embodiments of systems and methods for use in authenticating consumers and/or computing devices to payment accounts. In an exemplary embodiment, a method generally includes generating, by a computing device, an authentication request for a consumer in response to a transaction by the consumer at a merchant. The transaction involves a payment account associated with the consumer, and the authentication request includes a direction to move a communication device associated with the consumer in a manner consistent with a reference movement. The method also includes receiving, by the computing device, an indication of movement of the communication device; comparing, by the computing device, the movement of the communication device to a reference movement; and then authenticating, by the computing device, the consumer to the payment account in connection with the transaction when the comparison indicates that the movement of the communication device matches the reference movement.

11 Claims, 5 Drawing Sheets

(56) References Cited

U.S. PATENT DOCUMENTS

| | | | |
|---|---|---|---|
| 10,356,091 B2 | 7/2019 | Kim et al. | |
| 10,366,217 B2* | 7/2019 | Finzi | H04L 9/321 |
| 2009/0320123 A1 | 12/2009 | Yu et al. | |
| 2012/0254032 A1 | 10/2012 | Carbonell Duque et al. | |
| 2012/0271547 A1* | 10/2012 | Mori | G08G 1/20 701/527 |
| 2013/0160088 A1 | 6/2013 | McFarland | |
| 2013/0218775 A1* | 8/2013 | Dabosville | G06F 3/0346 705/44 |
| 2013/0254107 A1* | 9/2013 | McClure | G06Q 40/00 705/42 |
| 2015/0006385 A1 | 1/2015 | Shah | |
| 2015/0124471 A1 | 4/2015 | Cooke et al. | |
| 2015/0269555 A1 | 9/2015 | Clark | |
| 2016/0012465 A1* | 1/2016 | Sharp | G06Q 20/321 705/14.17 |
| 2016/0132864 A1 | 5/2016 | Barrese et al. | |
| 2016/0224962 A1* | 8/2016 | Herwig | G06F 21/316 |
| 2017/0011395 A1* | 1/2017 | Pillai | G06Q 20/3227 |
| 2017/0103388 A1* | 4/2017 | Pillai | G06Q 20/3829 |
| 2017/0293950 A1* | 10/2017 | Rathod | G06Q 30/0283 |
| 2018/0053187 A1 | 2/2018 | Borkar | |
| 2019/0130745 A1* | 5/2019 | Turato | G08G 1/205 |
| 2020/0167702 A1* | 5/2020 | Beaurepaire | G01C 21/3438 |
| 2020/0175429 A1* | 6/2020 | Beaurepaire | G06N 7/01 |

OTHER PUBLICATIONS

Secure Mobile Payment Systems IEEE (Year: 2014).*
Secure remote mobile payment architecture and application IEEE 2010 (Year: 2010).*
Secure remote mobile payment architecture and application IP Journal 2017 (Year: 2017).*
U.S. Appl. No. 15/240,201, filed Aug. 18, 2016.
U.S. Appl. No. 15/240,201, filed Aug. 18, 2016, Vijaykumar Vamanrao Borkar.
"Curve Matching Using the Fast Marching Tool", M. Frenkel and R. Basri, Weizmann Institute of Science, Rehovot, Israel; EMMCVPR 2003, LNCS 2683; http://www.wisdom.weizmann.ac.il/~vision/CurveLab/FrenkelBasri.pdf; pp. 35-51.
"Curve Matching for Open 2D Curves", M. Cui, J. Femiani, J. Hu, P. Wonka and A. Razdan; https://peterwonka.net/Publications/pdfs/2009.PRL.Ming.CurveMatching2d.Preprint.pdf; Jun. 4, 2009; 25 pgs.

* cited by examiner

SYSTEMS AND METHODS FOR USE IN AUTHENTICATING CONSUMERS IN CONNECTION WITH PAYMENT ACCOUNT TRANSACTIONS

CROSS-REFERENCE TO RELATED APPLICATION

This application is a continuation of U.S. patent application Ser. No. 15/240,201 filed Aug. 18, 2016. The entire disclosure of the above application is incorporated herein by reference.

FIELD

The present disclosure generally relates to systems and methods for use in authenticating consumers in connection with payment account transactions, and in particular, to authenticating the consumers and/or communication devices associated with the consumers based on movements of the communication devices consistent with reference movements and/or instructions.

BACKGROUND

This section provides background information related to the present disclosure which is not necessarily prior art.

Payment accounts are known to be used to fund transactions for the purchase of products (e.g., goods, services, etc.). When consumers present payment account credentials to merchants, for example, the merchants perform one or more steps to authenticate the consumers. In connection therewith, the consumers may be requested to present identification, to provide signatures, passwords (e.g., one-time passwords, etc.), or to enter personal identification numbers (PINs). Additional authentication techniques may also, or alternatively, be implemented involving the use of biometrics. In any case, authentication of the consumers is generally included in processing the payment account transactions to ensure that the consumers are authorized to use the payment accounts and/or to limit the occurrences of unauthorized transactions. When the consumers are authenticated, by whatever technique(s) prescribed, the merchants are then able to continue with the transactions and deliver the products to the consumers.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Authentication of consumers is generally required as part of payment account transactions by the consumers at merchants. The authentication is often dependent, at least in part, on manners of interaction between the consumers and the merchants. For example, when payment account credentials are presented directly to the merchants, the consumers may be asked for identifications and/or to enter personal identification numbers (PINs) into point of sale (POS) terminals at the merchants for authentication. However, when payment account credentials are presented in electric form in connection with the transactions, for example, via payment applications (e.g., virtual wallets, etc.) or via other non-payment based applications or other stand-alone applications, or via network-based applications (e.g., merchant websites, etc.), the available types of authentication may be limited.

Uniquely, the systems and methods herein permit communication devices, associated with consumers initiating payment account transactions, to be moved in particular manners as forms of authentication, and as manners of confirming possession of the communication devices by consumers. Specifically, in response to a given payment account transaction, a consumer is invited and/or directed to move a communication device associated with the consumer in a prescribed manner. The communication device recognizes its movement (if any) and determines if the movement matches the prescribed manner. The communication device then establishes authentication of the consumer, when the movement matches the prescribed manner. As such, the communication device, which may include a smartphone or other device already in the possession of the consumer, is repurposed herein as a means of authenticating the consumer at least for transactions where the communication device is known (e.g., registered, etc.) to one or more entities associated with processing the transactions (e.g., a payment network, an issuer of the payment account involved in the transaction, or another entity attempting to ensure that the consumer is an authorized user of the payment account in connection with the transactions, etc.).

Figure 1:
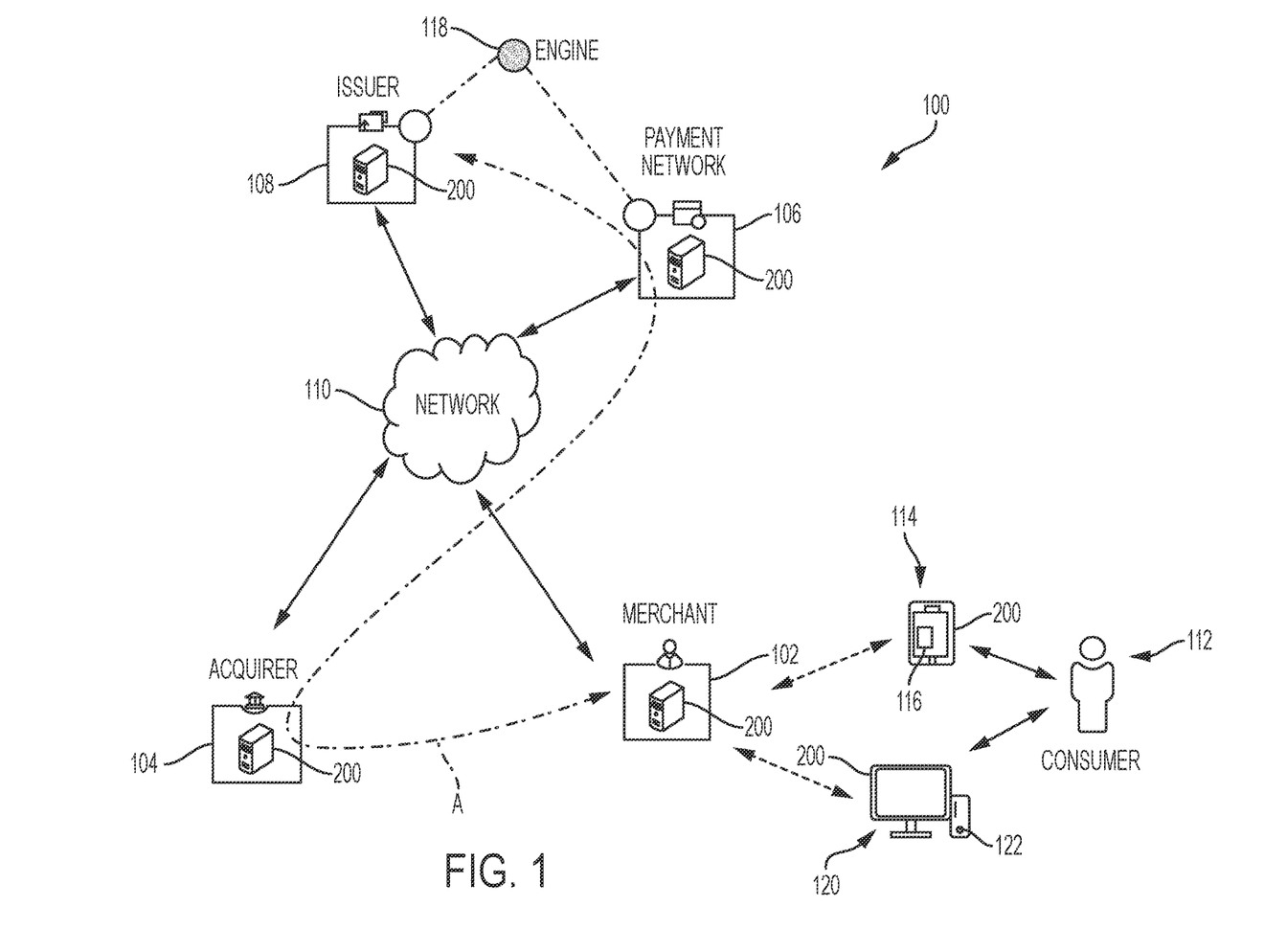
FIG. 1 is a block diagram of an exemplary system of the present disclosure suitable for use in authenticating consumers and/or communication devices, in connection with payment account transactions by the consumers, based on movements of the communication devices.

FIG. 1 illustrates an exemplary system 100, in which one or more aspects of the present disclosure may be implemented. Although, in the described embodiment, the system 100 is presented in one arrangement, other embodiments may include the system 100 arranged otherwise, depending on, for example, types of transactions involved, processing of the transactions, types of merchants involved in the transactions, etc.

As shown in FIG. 1, the system 100 generally includes a merchant 102, an acquirer 104, a payment network 106, and an issuer 108, each coupled to (and in communication with) network 110. The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the network 110 may include a private payment transaction network made accessible by the payment network 106 to the acquirer 104 and the issuer 108 and, separately, a public network (e.g., the Internet, etc.) through which the merchant 102 and the acquirer 104 may communicate (e.g., via a website or via network-based applications, etc.).

In the system 100, the merchant 102 offers products (e.g., goods, services, etc.) for sale to consumers, such as consumer 112. In particular, in this embodiment, the merchant 102 offers the products for sale through a virtual storefront, such as, for example, a merchant website. In this manner, when the consumer 112, for example, attempts a purchase transaction, the consumer 112 is not physically present at the merchant 102, whereby certain traditional forms of authentication are not available. It should be appreciated that while the system 100 is described with reference to a virtual store-front of merchant 102, other system embodiments may include a physical storefront of the merchant 102 or other types of storefronts offered by the merchant 102 and/or other merchants, with the description herein still applicable thereto (i.e., the present disclosure is not limited to transactions at virtual store-fronts of merchants).

The consumer 112 in the system 100 is associated with a payment account, which may be used to fund purchases with merchants, including the merchant 102. In the illustrated embodiment, the payment account is issued to the consumer 112 by the issuer 108 (however, this is not required in all embodiments), and is associated with a payment device (e.g., a payment card, a fob, a payment application, etc.). The consumer 112 is also associated with a communication device 114 (e.g., a smartphone, a tablet, etc.). In the illustrated embodiment, the communication device 114 includes an application 116 configured to perform as described herein (e.g., capture and/or transmit prescribed movements of the communication device 114 to authentication engine 118, etc.). In some aspects of the system 100, the application 116 may also include, for example, an electronic wallet (or e-wallet) payment application (e.g., a virtual wallet application such as MasterPass®, Apple Pay®, Android Pay™, Samsung Pay®, PayPal®, Google Wallet®, etc.), which configures the communication device 114 to also act as a payment device for and/or with the consumer's payment account (which is stored in and/or associated with the application 116) and potentially one or more additional payment accounts associated with the consumer 112 (and stored and/or associated with the application 116). In other aspects of the system 100, however, the application 116 associated with the communication device 114 is (or may include) a non-payment application.

In an example transaction in the system 100, when the consumer 112 desires to make a purchase at the merchant 102, funded by the payment account (i.e., a payment account transaction), the consumer 112 presents payment account information/credentials to the merchant 102 (e.g., a primary account number (PAN) or other payment account identifier, etc.). This may be achieved via the application 116 included in the communication device 114 acting as a payment application (and allowing the communication device 114 to operate as a payment device), or via another payment device associated with the payment account (e.g., a payment card, etc.), or potentially manually (or otherwise independent of the application 116) via a network interface (or website or web browser) provided by the merchant 102 and viewable by the consumer 112 at the communication device 114 or at workstation 120 associated with the consumer 112 (or potentially at another computing device associated with the consumer 112 such as a tablet, etc.). In turn, in any case, the merchant 102 reads/receives the payment account information (broadly, credentials) for the consumer's payment account (e.g., from the consumer's communication device 114 as included in the application 116, as manually provided by the consumer 112 via a web browser associated with the merchant 102, etc.). The merchant 102 then causes an authorization request (or authorization message), for the transaction, to be transmitted to the acquirer 104, along path A in the system 100. Again, it should be appreciated that the transaction may be initiated between the consumer 112 and the merchant 102 in various different manners, with or without use of the application 116.

In turn in this example transaction, the acquirer 104 communicates the authorization request with the issuer 108 (associated with the consumer's payment account) along path A through the payment network 106, such as, for example, through MasterCard®, VISA®, Discover®, American Express®, etc. The issuer 108 determines whether the consumer's payment account is in good standing and whether there are sufficient funds and/or credit to fund the transaction. If approved, an authorization reply, or response (indicating the approval of the transaction), is transmitted back from the issuer 108 to the merchant 102 along path A, thereby permitting the merchant 102 to complete the transaction. The transaction is later cleared and/or settled (via appropriate transaction messages such as clearing messages and/or settlement messages, for example) by and between the merchant 102, the acquirer 104, and the issuer 108 (by appropriate agreements). If the transaction is declined, however, an authorization reply (indicating the decline of the transaction) is provided back to the merchant 102, thereby permitting the merchant 102 to halt or terminate the transaction, or request alternate funding.

Transaction data is generated, collected, and stored as part of the above interactions among the merchant 102, the acquirer 104, the payment network 106, the issuer 108, and the consumer 112. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, transaction data may be transmitted among parts of the system 100 as desired and/or necessary. As used herein, transaction data may include, for example (and without limitation), PANs for accounts involved in the transactions, amounts of the transactions, merchant IDs for merchants involved in the transactions, merchant category codes (MCCs), dates/times of the transactions, etc. It should be appreciated that more or less information related to transactions, as part of either authorization or clearing and/or settling, may be included in transaction records (comprising transaction data) and stored within the system 100, at the merchant 102, the acquirer 104, the payment network 106 and/or the issuer 108.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions herein, subsequently for one or more of the different purposes described herein.

Figure 2:
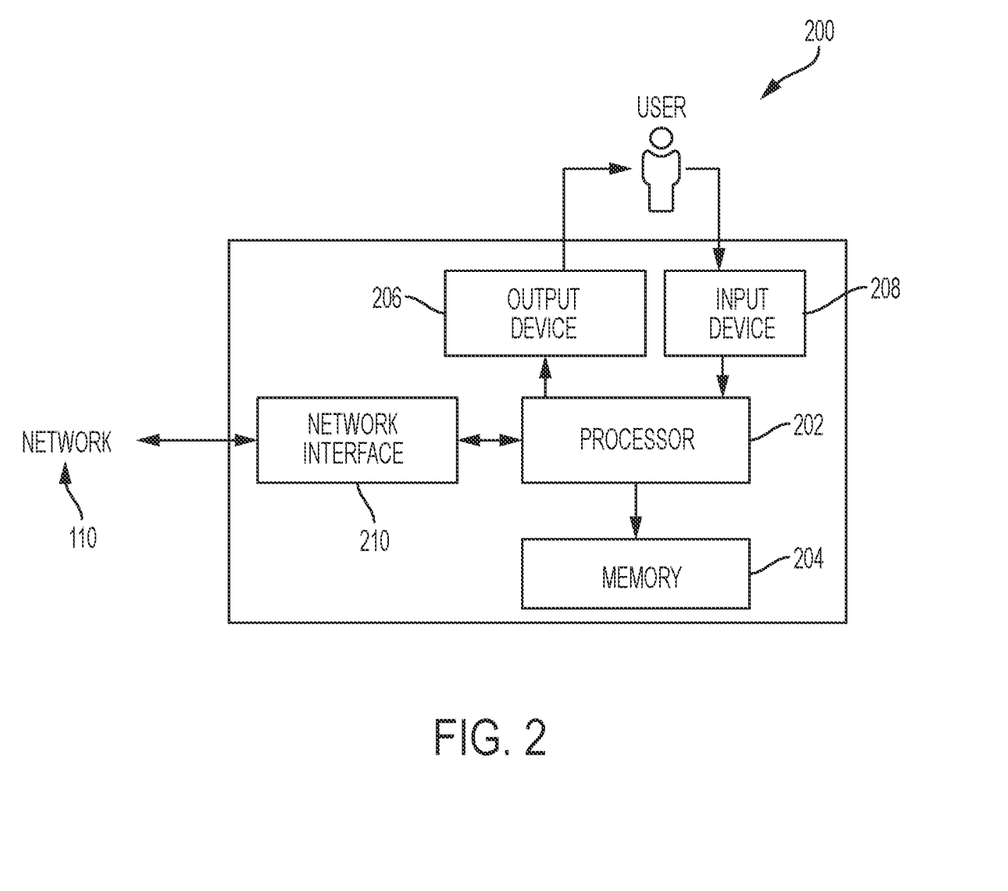
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, routers, personal computers, tablets, laptops, smartphones, point-of-sale (POS) terminals, etc. In addition, the computing device 200 may include a single computing device, or it may include multiple computing devices located in close proximity or distributed over a geographic region, so long as the computing devices are specifically configured to function as described herein.

In the exemplary embodiment of FIG. 1, each of the merchant 102, the acquirer 104, the payment network 106, and the issuer 108 are illustrated as including, or being implemented in, computing device 200, coupled to (and in communication with) the network 110. In addition, the communication device 114 and the workstation 120 associated with consumer 112 are illustrated as including, or being implemented in, a computing device 200 (capable of coupling to network 200, for example, as desired). However, the system 100 (and the parts therein) should not be considered to be limited to the computing device 200, as described below, as different computing devices and/or arrangements of computing devices may be used. In addition, different components and/or arrangements of components may be used in other computing devices.

The exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account information, communication device information (e.g., associations between payment accounts and communication devices, etc.), and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes an output device 206 that is coupled to (and is in communication with) the processor 202. The output device 206 outputs information, for example, visually, audibly, etc., to a user of the computing device 200, such as, for example, the consumer 112, etc. It should be further appreciated that various interfaces (e.g., as defined by network-based applications, etc.) may be displayed at computing device 200, and in particular at output device 206, to display such information. The output device 206 may include, without limitation, a liquid crystal display (LCD), a light-emitting diode (LED) display, an LED, an organic LED (OLED) display, an "electronic ink" display, speakers, etc. In some embodiments, output device 206 includes multiple devices.

The computing device 200 also includes an input device 208 that receives inputs from the user (i.e., user inputs) such as, for example, selections of options for transactions, movements of the computing device 200 in prescribed manners, movements and/or accelerations of the computing device 200 in prescribed directions, etc. The input device 208 is coupled to (and is in communication with) the processor 202 and may include, for example, a keyboard, a pointing device, a gyro sensor, an accelerometer, a mouse, a button, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 further includes a network interface 210 coupled to (and in communication with) the processor 202 and the memory 204. The network interface 210 may include, without limitation, a wired network adapter, a wireless network adapter (e.g., a near field communication (NFC) adapter, a Bluetooth adapter, etc.), a mobile network adapter, or other device capable of communicating to/with one or more different networks, including the network 110. Further, in some exemplary embodiments, the computing device 200 includes the processor 202 and one or more network interfaces (including the network interface 210) incorporated into or with the processor 202.

Referring again to FIG. 1, the authentication engine 118 of the system 100 is configured, by executable instructions, to perform one or more operations described herein. As shown, the authentication engine 118 includes a standalone computing device consistent with computing device 200 and implemented, for example, at a location along path A in the system 100 (so that the authentication engine 118 can perform as described herein). As indicated by the dotted lines, however, the authentication engine 118 may be incorporated, in whole or in part, into the payment network 106 and/or the issuer 108. Or, in some embodiments, the authentication engine 118 may be incorporated, in whole or in part, into the application 116, as described below. It should further be appreciated that, in some embodiments, the authentication engine 118 may be provided by one or more service providers associated with the payment network 106, the issuer 108, or otherwise, but not shown in FIG. 1.

In the exemplary embodiment, the authentication engine 118 is configured to interact with the application 116, initially, for registration of the communication device 114 to the engine 118 and, subsequently, for authentication of the consumer 112, via the communication device 114, in payment account transactions initiated by the consumer 112.

In connection with registering the communication device 114 to the authentication engine 118, the application 116 is configured to prompt the consumer 112 to move the communication device 114 in a unique, desired manner, thereby providing a "motion signature" or reference pattern (generally only known to the consumer 112, and generally specified by the consumer 112). The application 116 is configured to detect the motion signature, and to transmit data indicative of the motion signature to the authentication engine 118. In turn, the authentication engine 118 stores the motion signature along with (and/or in association with) certain other information about the communication device 114 (e.g., APP ID, phone number, serial number, etc.) so that the communication device 114 can be subsequently identified and/or the consumer's associated payment account (e.g., the PAN, a name of the consumer, an address for the consumer, etc.), for example, in memory 204. Upon storing the motion signature and other information, the communication device 114 is registered to the authentication engine 118 as an authentication mechanism for the consumer 112 and his/her payment account. It should be appreciated that in one or more embodiments, the motion signature may be retained in the communication device 114, for example, in memory 204, for comparison therein, and not transmitted and/or stored in the authentication engine 118 (i.e., the motion signature may be stored directly onboard the communication device 114 for subsequent use as described herein).

In connection with authenticating the consumer 112 upon initiating a payment account transaction at the merchant 102 (e.g., in connection with the example transaction described above, etc.), the authentication engine 118 is configured to detect the transaction to the consumer's payment account and determine whether the consumer's communication device 114 is registered (e.g., based on the PAN for the consumer's payment account included in the authorization request for the payment account transaction, etc.) (which it is in this example). The authentication engine 118 is then configured to request authentication by the consumer 112, via a prescribed movement of the communication device 114.

In one aspect of the illustrated embodiment, upon initiating the payment account transaction, for example, via the application 116, the application 116 is configured to prompt the consumer 112, via the communication device 114, to move the communication device 114 according to a prescribed movement (e.g., a reference movement, etc.). The prescribed movement may include one or more separate movements consistent with the stored motion signature, or the prescribed movement may include one or more generic movements consistent with predefined instructions (e.g., randomly generated one-time instructions, etc.) provided by the authentication engine 118 (and/or by the application 116). In either case, the application 116 is configured to detect the movement of the communication device 114 (as made by the consumer 112) and to transmit data indicative of the movement to the authentication engine 118.

In another aspect of the illustrated embodiment, upon initiating the payment account transaction, for example, via a website (or web browser) associated with the merchant 102 (or associated with another part of the system 100) (e.g., by manually providing account information to the website, etc.), a network-based application (other than the application 116) may deliver instructions to the consumer 112 to move the communication device 114 according to a prescribed movement (e.g., a reference movement, etc.) and/or predefined instructions (e.g., randomly generated one-time instructions, etc.). For example, in the system 100, the workstation 120 includes a website and/or web browser application 122 configured to prompt the consumer 112 to move the communication device 114 according to the prescribed movement and/or predefined instructions (e.g., when the workstation 120 is accessing the website associated with the merchant 102 to initiate the payment account transaction, via another accessible website or web browser, etc.). Or, in similar fashion, a website and/or web browser application at the communication device 114 may be configured to deliver the instructions to the consumer 112, for example, via a website (or web browser) accessible at the communication device 114. The application 116 at the communication device 114, then, is configured to detect the movement of the communication device 114 (as made by the consumer 112) and to transmit data indicative of the movement to the authentication engine 118, as appropriate.

In turn, in either of the above aspects, the authentication engine 118 is configured to compare the received movement to the prescribed movement, for example, either to the stored motion signature or the predefined instructions (depending on the prescribed movement). Then, the authentication engine 118 is configured to transmit an authentication success message to the payment network 106 and/or issuer 108 to thereby permit the payment account transaction to proceed when there is a match between the received movement and the prescribed movement, and decline the transaction if there is not match.

In at least one alternative embodiment, in connection with authenticating the consumer 112 upon initiating a payment account transaction at the merchant 102, the application 116 is configured (e.g., operating as part of the authentication engine 118; etc.) to detect the transaction and determine whether the consumer's communication device 114 is registered (which, again, it is in this example). The application 116 is then configured to request authentication by the consumer 112, via the communication device 114, and to detect a responsive authenticating movement of the communication device 114. The application 116 is further configured to compare the received movement to either a motion signature stored therein or predefined movement instructions provided to the consumer 112 by the application 116 (depending on the prescribed movement requested by the application 116). And, like described above for the authentication engine 118, the application 116 is then configured to transmit an authentication success message to the payment network 106 and/or issuer 108 to thereby permit the transaction to proceed when the is a match between the received movement and the prescribed movement, and to transmit an authentication fail message when there is no a match.

Figure 3:
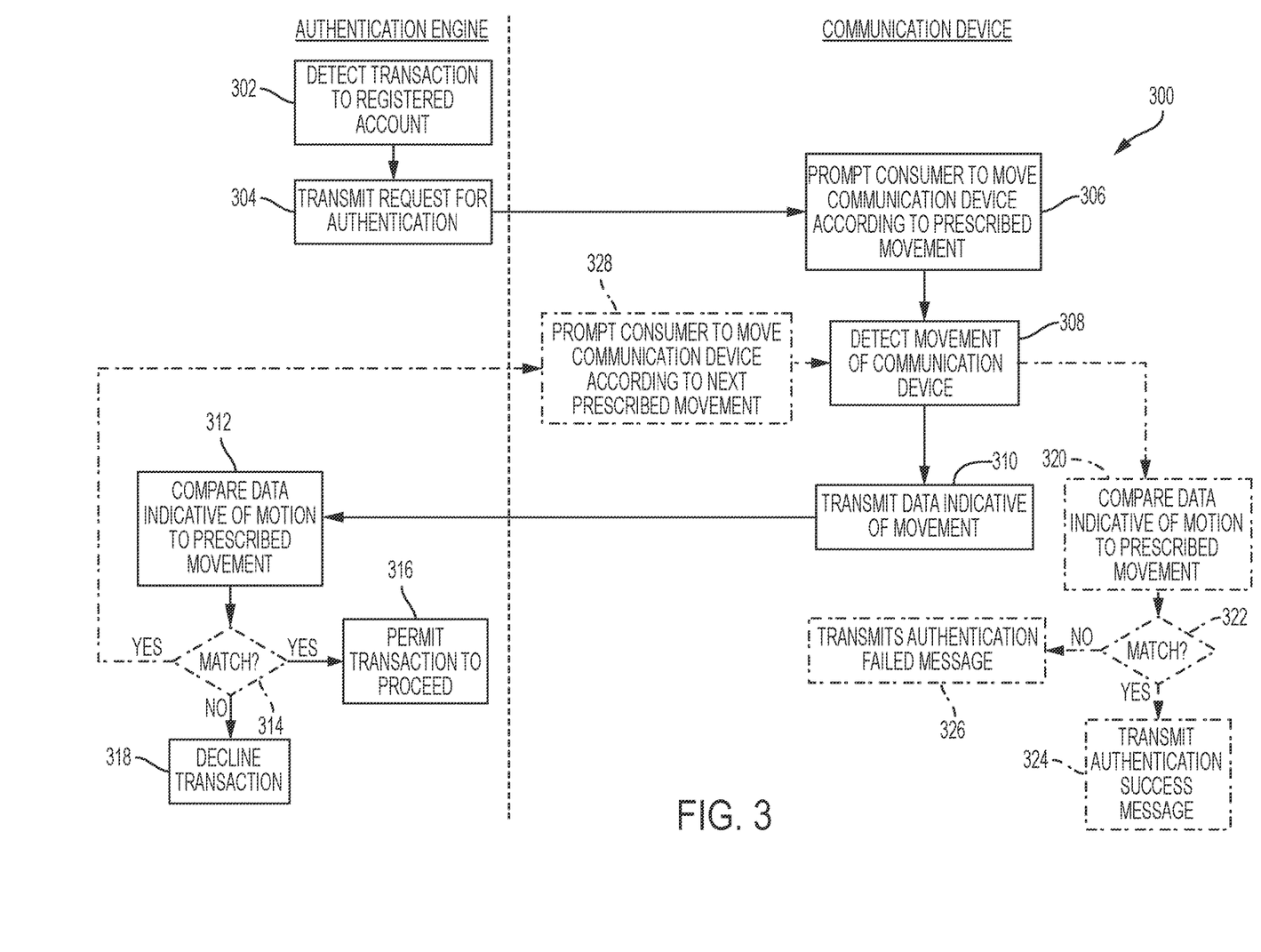
FIG. 3 is an exemplary method for use in facilitating a payment account transaction between a merchant and a consumer, and which is suitable to be implemented in the system of FIG. 1.

FIG. 3 illustrates an exemplary method 300 for use in authenticating a consumer to a payment account, in connection with a payment account transaction by the consumer at a merchant. The method 300 is described with reference to the system 100, and in particular to the application 116 at the communication device 114 and the authentication engine 118, and further with reference to the computing device 200. The methods described herein (including the method 300), however, should not be considered to be limited to the system 100, or the computing device 200. Likewise, the systems and devices herein should not be considered to be limited to the method 300.

In the exemplary method 300, the payment account for the consumer 112 and the communication device 114 associated with the consumer 112 are registered to the authentication engine 118. In connection therewith, credentials for the consumer's payment account (e.g., the PAN, the consumer's name, the consumer's address, etc.) are stored in memory 204 associated with the authentication engine 118 (e.g., in a data structure associated with the authentication engine 118, etc.) in association with a motion signature (e.g., a reference movement, etc.) for the consumer 112. As such, the motion signature is available for use as described below, for example, in authenticating the consumer 112 in connection with a transaction to the consumer's payment account.

When the consumer 112 initiates a transaction, for example, at the merchant 102 using the consumer's payment account, the merchant 102 receives the credentials for the payment account (either directly from the consumer 112, or potentially via the application 116 operating as a payment application) and generates an authorization request for the transaction. In turn, the merchant 102 directs the authorization request to the acquirer 104, which then communicates it to the issuer 108 via the payment network 106 (as described above in the system 100) for approval.

As shown in FIG. 3, in connection with this transaction, the authentication engine 118, based on its placement and/or access in system 100, initially detects, at 302, the authorization request for the transaction and identifies the transaction therein as being related to a registered payment account (i.e., to the consumer's payment account in this example). Such identification may be based on the PAN for the consumer's payment account included in the authorization request for the transaction, or a token associated therewith (e.g., when the transaction is initiated by a payment application aspect of the application 116, etc.) or other payment account identifier, where certain PANs and/or tokens (or ranges thereof) are identified by the authentication engine 118 as being associated with a registered payment account. In response, the authentication engine 118 generates and transmits, at 304, a request for authentication (of the consumer 112 and/or the communication device 114). The request may be transmitted (at 304) directly to the communication device 114 (and in particular, to the application 116), or to another computing device (e.g., to the workstation 120 via a web browser, etc.) accessible by the consumer 112. Upon receipt of the request by the communication device 114, the communication device 114 (via the application 116) prompts the consumer 112, at 306, to move the communication device 114 according to a prescribed movement. Alternatively at 306, upon receipt of the request by the workstation 120, for example, the workstation 120 (via the application 122) may prompt the consumer 112 to move the communication device 114 according to a prescribed movement. In the illustrated method 300, in either of the above cases, this includes prompting the consumer 112 to move the communication device 114 in a manner consistent with the motion signature of the consumer 112 captured during registration of the communication device 114 (and registration of the consumer's payment account). Alternatively, however, this may include prompting the consumer 112 to move the communication device 114 in a manner consistent with instructions provided by the authentication engine 118 to the consumer 112 (at the communication device 114).

Figure 4:
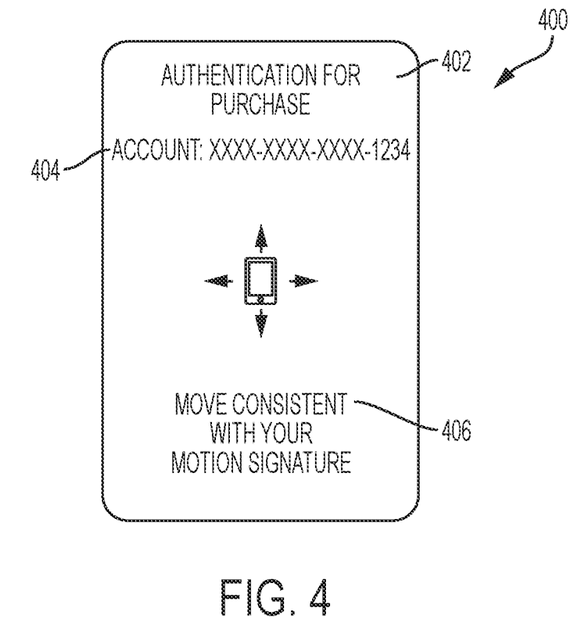
FIG. 4-8 are exemplary interfaces that may be displayed at a communication device (or at another computing device accessible by a consumer), in connection with a payment account transaction by the consumer, to direct/allow the consumer to move the communication device in a prescribed manner for use in authenticating the consumer, and which may be suitable for use in the system of FIG. 1 and/or the method of FIG. 3.

FIG. 4 illustrates an exemplary interface 400, which may be displayed to the consumer 112 at the communication device 114 (via the application 116) or at the workstation 120 (via the application 122), in connection with authenticating the consumer 112 and/or the communication device 114 for the payment account transaction by the consumer 112 at the merchant 102. In particular, the interface 400 prompts the consumer 112 to move the communication device 114 in a manner consistent with the motion signature of the consumer 112 captured during registration with the authentication engine 118. As shown, the interface 400 generally includes an indicator 402 of the transaction for which the authentication is being requested, as well as an indicator 404 of the consumer's payment account involved in the transaction. The interface 400 then also includes an instruction 406 (or prompt), as provided by the authentication engine 118, to move the communication device 114 consistent with the consumer's motion signature. With that said, it should be appreciated that the interface 400 (and the other interfaces included herein) are exemplary in nature, and that other interfaces with other configurations (and displaying other data) may be employed in the method 300 (and/or in the system 100) within the scope of the present disclosure.

Figure 5:
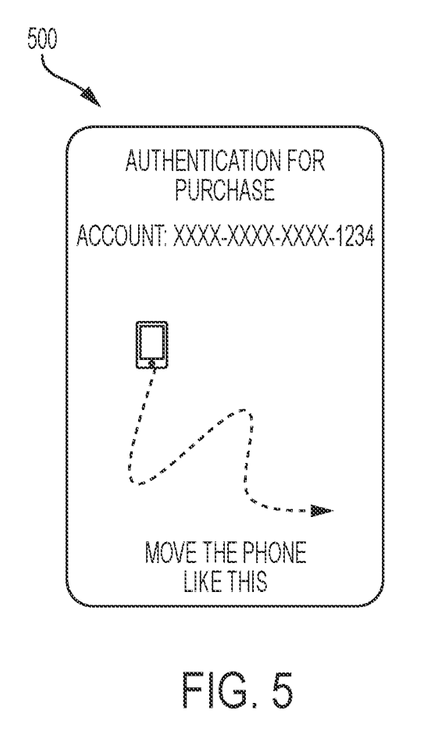
Figure 6:
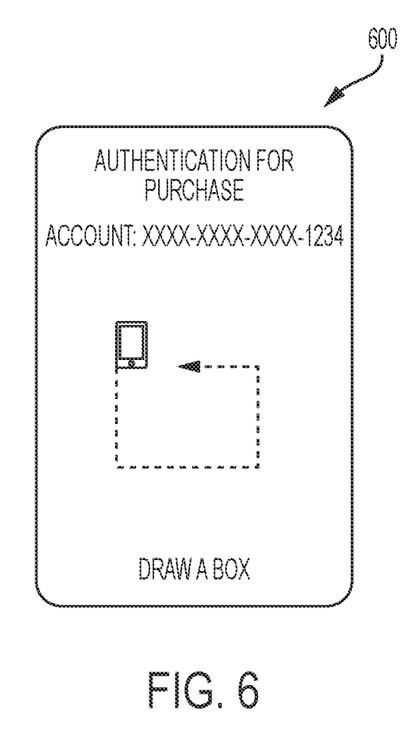

FIGS. 5 and 6 illustrate exemplary interfaces 500, 600, which may alternatively be displayed to the consumer 112 at the communication device 114 (via the application 116) or at the workstation 120 (via the application 122), in connection with authenticating the consumer 112 and/or the communication device 114 for the payment account transaction by the consumer 112 at the merchant 102. The interfaces 500, 600 are similar to the interface 400, but instead prompt the consumer 112 to move the communication device 114 in a manner consistent with specific instructions provided by the authentication engine 118 to the consumer 112 (to generate a pattern not previously specified by the consumer 112). In particular, in the interface 500, the authentication engine 118 prompts the consumer 112 to move the communication device 114 in a generally W-like motion. And, in the interface 600, the authentication engine 118 prompts the consumer 112 to move the communication device 114 in a manner that generally forms a box. With that said, it should be appreciated that the authentication engine 118 may prompt the consumer 112 to move the communication device 114 in accordance with any desired movement in the interfaces 500, 600, in connection with authenticating the consumer 112. For example, the authentication engine 118 may prompt the consumer 112 for a movement associated with a common shape such as a box, a circle, a generally W shape, a generally Z shape, a generally B shape, etc.; or for a movement associated with some other non-descript pattern; etc.

With reference again to FIG. 3, after prompting the prescribed movement (be it by the communication device 114 or the workstation 120), the communication device 114 (via the application 116) detects, at 308, movement of the communication device 114 and transmits, at 310, data indicative of the movement to the authentication engine 118 (e.g., data representing an image of the movement, etc.). As an example, the prescribed movement of the communication device 114 may be collected and transmitted in terms of X, Y, Z values of a gyro-sensor, per unit time (e.g., sub-second time, etc.), and/or in terms of X, Y, Z values of an accelerometer, per unit time (e.g., again, sub-second time; etc.). In connection therewith, such movement data may be comprised of one or more series of these values over time, from the moment the movement starts to the moment it is completed. Then, the prescribed movement for the communication device 114 is transmitted when all of the movement data (comprising the one or more series of movement values) is collected.

It should be appreciated that different devices (e.g., different communication devices, etc.) may have different ways of representing movement data over time (e.g., from start of a movement to end of the movement, etc.), depending on its underlying hardware. In general, the devices may use gyro-sensor hardware and/or accelerometer hardware, where operating systems of the devices then provide access to the movement data, by the application 116, in X, Y, Z parameters. For devices comprising gyro-sensor hardware, this movement data may include radians per second (rad/s) along X, Y, Z axes of the gyro-sensor. For devices comprising accelerometer hardware, this movement data may include meters per square second (m/s$^2$) along X, Y, Z axes of the associated sensor. In addition, some devices may be equipped with both gyro-sensor hardware and accelerometer hardware integrated together, for example, in a single chip, etc. Here, the captured movement data/values may include $X_g$, $Y_g$, $Z_g$, $X_a$, $Y_a$, $Z_a$ parameters, where "g" represents gyro-sensor output and "a" represents accelerometer output (all of which, again, are captured by taking the values over a period of time).

Upon receipt of the movement data from the communication device 114 (and, particularly, from the application 116), the authentication engine 118 compares, at 312, the received movement data to the prescribed movement. In particular in the method 300, this includes comparing the received movement data to the motion signature for the consumer 112, stored in memory 204 at the authentication engine 118. In connection therewith, at 314, the authentication engine 118 determines whether a match exists or not. The match may include an exact match between the received movement data and the prescribed movement, or it may include a substantial match. Various available operations may be used to identify matches between the received movement data and the prescribed movement. As an example, matching operations may be based on known curve/pattern matching algorithms that compare the prescribed movement (i.e., an imaginary movement thereof) with the movement data described above (i.e., the series of movement values over time), as captured/received from the communication device 114. In connection therewith, any deviation in the matching is generally controlled (and/or inputted) in the utilized curve/pattern matching algorithm. Example curve/pattern matching algorithms and related operations, that may be employed, include, without limitation, those described at http://www.wisdom.weizmann.ac.il/~vision/CurveLab/FrenkelBasri.pdf and http://peterwonka.net/Publications/pdfs/2009.PRL.Ming.CurveMatching2d.Preprint.pdf (each of which is incorporated herein by reference in its entirety).

When the received movement data for the communication device 114 matches the prescribed movement (at 314), and the consumer 112 is authenticated, the authentication engine 118 permits the transaction to proceed, at 316. For example, depending on where the authentication engine 118 receives the authorization request, this may include permitting the authorization request to proceed along path A in the system 100 (e.g., to the payment network 106, to the issuer 108, etc.) or this may include permitting an authorization reply for the transaction to proceed back to the merchant 102. In addition, the authentication engine 118 may also transmit a communication to the consumer 112, at the communication device 114 (e.g., via the application or otherwise, etc.) indicating the successful authentication.

Conversely, when the received movement data for the communication device 114 does not match the prescribed movement (at 314), and the consumer is not authenticated, the authentication engine 118 declines the transaction, at 318. Depending on location of the authentication engine 118 in the system 100, the authentication engine 118 may then generate and transmit a decline message to the merchant 102. For example, when the authentication engine 118 is associated with the payment network 106, the authentication engine 118 may generate and transmit the decline message to the payment network 106, which in turn transmits the decline message to the merchant 102. Or, when the authentication engine 118 is associated with the issuer 108, the authentication engine 118 may generate and transmit the decline message to the issuer 108, which in turn transmits the decline message to the merchant 102 via the payment network 106. Or further, the authentication engine 118 may append a decline to the authorization request so that, upon receipt by the issuer 108, the issuer may generate an authorization reply declining the transaction (based on the declined authentication). In addition, the authentication engine 118 may also transmit a communication to the consumer 112, at the communication device 114 (e.g., via the application or otherwise, etc.) indicating the unsuccessful authentication.

With continued reference to FIG. 3, optionally in the method 300 (as indicated by the broken lines), upon detecting the movement of the communication device 114 (at 308) in response to the prescribed movement, the communication device 114 (via the application 116) may compare the received movement data to the prescribed movement, at 320, at the communication device 114 (e.g., operating as a part of the authentication engine 118, etc.). The comparison may be performed in a similar manner to that described above (and performed at 312 by the authentication engine 118) or it may be different. Then, at 322, the communication device 114 (via the application 116) may determine whether a match exists or not.

In this optional application of the method 300, when the received movement data for the communication device 114 matches the prescribed movement (at 322), and the consumer 112 is authenticated, the communication device 114 (via the application 116, potentially operating as, or in conjunction with, the authentication engine 118, or not) transmits an authentication success message, at 324, for example, to the authentication engine 118 by which the transaction is permitted to proceed (as described above in connection with operation 316). Conversely, when the received movement data for the communication device 114 does not match the prescribed movement (at 322), and the consumer 112 is not authenticated, the communication device 114 (via the application 116) transmits an authentication failed message, at 326, for example, to the authentication engine 118 by which the transaction is declined (as described above in connection with operation 318).

As a further option in the method 300 (as again indicated by the dotted lines in FIG. 3), when the received movement data for the communication device 114 matches the prescribed movement (at 314), as determined by the authentication engine 118, the consumer may be prompted, at 328, by the authentication engine 118 to move the communication device 114 according to another prescribed movement. As described above in connection with operation 306, such prompting may be delivered to the consumer 112 at the communication device 114 (via the application 116) or at the workstation 120 (via the application 122). In either case, for example, the consumer 112 may be required to correctly move the communication device 114 according to each of a sequence of prescribed movements. Here, a first prescribed movement in a sequence may be based on instructions provided to the consumer 112 by the authentication engine 118. And, a second prescribed movement in the sequence may be based on the motion signature of the consumer 112 captured during registration of the communication device 114. Then, when the received movement data for the communication device 114 matches each of the prescribed movements, in sequence, the authentication engine 118 permits the transaction to proceed at 316. Conversely, when the received movement data for the communication device 114 does not match either of the prescribed movements, as they are presented in sequence, the authentication engine 118 declines the transaction at 318.

It should be appreciated that such a sequence of prescribed movements may similarly be applied in the method in connection with the comparison at 320 and 322. It should also be appreciated that any number of prescribed movements may be included in a sequence and used to authenticate the consumer 112 herein.

Figure 7:
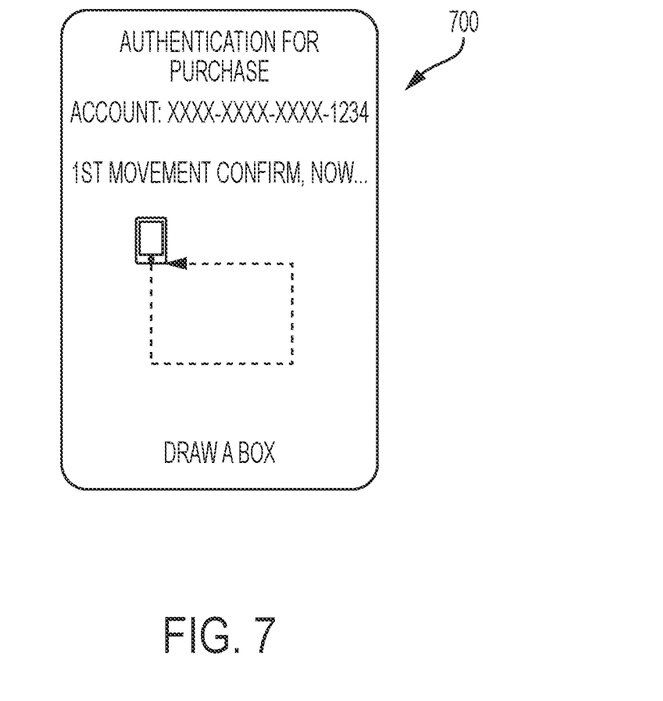
Figure 8:
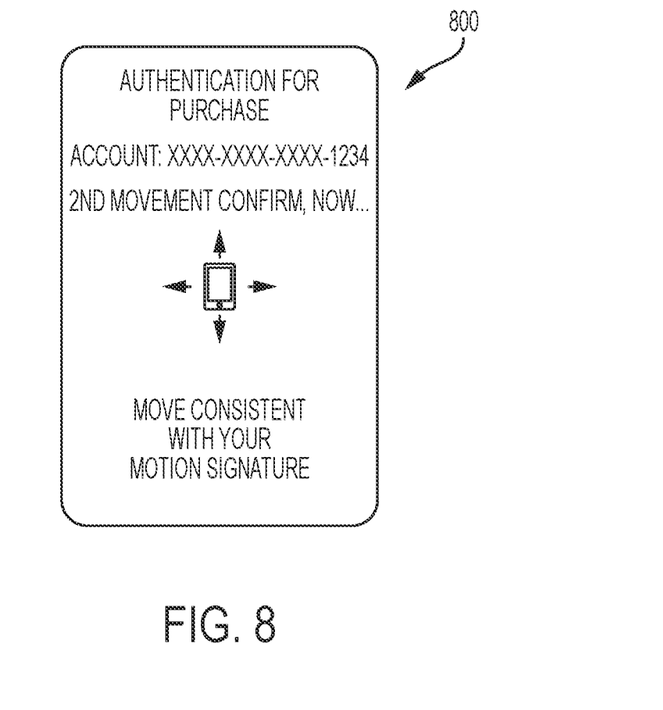

FIGS. 7 and 8 illustrate exemplary interfaces 700, 800, which may alternatively be displayed to the consumer 112 at the communication device 114 (via the application 116) or at the workstation 120 (via the application 122), in connection with authenticating the consumer 112 and/or the communication device 114 for the payment account transaction by the consumer 112 at the merchant 102. The interfaces 700, 800 are again similar to the interface 400, but instead prompt the consumer 112 to move the communication device in a manner consistent with a sequence of prescribed movements provided by the authentication engine 118 to the consumer 112. In particular, in the interface 700, the authentication engine 118 prompts the consumer 112 (via the payment application 116) to move the communication device 114 in a first manner that generally forms a box. Then, in the interface 800, the authentication engine 118 prompts the consumer 112 (via the payment application 116) to move the communication device 114 in a second manner consistent with the consumer's motion signature. As described above, both movements of the communication device 114 must match the corresponding prescribed movements in order for the consumer 112 to be authenticated.

In view of the above, the systems and methods herein provide for authenticating consumers in connection with payment account transactions through prescribed movements of communication devices associated with the consumers. Such movements may relate to motion signatures predefined by the consumers (and, thus, only known to the consumers), or they may relate to specific movement instructions provided to the consumers. In either case, an added layer of assurance is provided to the transactions, when the consumers are authenticated in accordance with the systems and methods herein, because such authentication confirms that the consumers are in possession of both the payment credentials for the particular payment accounts used in the transactions as well as the communication devices used to provide the required movements.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transforms a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by (a) generating an authentication request for a consumer in response to a transaction by the consumer at a merchant, the transaction involving a payment account associated with the consumer, and the authentication request including a direction to move a communication device associated with the consumer in a manner consistent with a reference movement; (b) directing the consumer to move the communication device consistent with the reference movement included in the authentication request (c) receiving an indication of movement of the communication device; (d) comparing the movement of the communication device to a reference movement; (e) authenticating the consumer to the payment account in connection with the transaction when the comparison indicates that the movement of the communication device matches the reference movement; and (f) declining authentication of the consumer when the comparison indicates that the movement of the communication device does not match the reference movement.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," "included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

In addition, as used herein, a product may include a service, a good, etc.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in authentication, the method comprising:
   detecting, by an authentication computing device, an authorization request from a merchant, the authorization request for a transaction by a consumer at the merchant, the transaction directed to a payment account associated with the consumer, the authorization request including a payment account credential for the payment account;
   determining whether at least one of the payment account and/or a communication device is registered to the authentication computing device, based on the payment account credential in the authorization request;
   based on i) the detected authorization request and ii) the at least one of the payment account and/or the communication device being registered:
      identifying, by the authentication computing device, a motion signature previously defined by the consumer, and stored in memory, based on the payment account credential included in the authorization request, the motion signature including multiple movements;
      generating, by the authentication computing device, an authentication request for the consumer, the authentication request including instructions to move the communication device associated with the consumer, sequentially, in a manner consistent with the multiple movements of the motion signature; and
      transmitting, by the authentication computing device, the authentication request to the communication device, whereby the consumer is directed to move the communication device, sequentially, in a manner consistent with the multiple movements of the motion signature;
   receiving, by the authentication computing device, indication of movement of the communication device, from the communication device, in response to the authentication request, the indication including per unit time values of the movement measured by at least one of a gyro sensor and/or an accelerometer included in the communication device;
   comparing, by the authentication computing device, the movement of the communication device to the motion signature;
   authenticating, by the authentication computing device, the consumer to the payment account in connection with the transaction, in response to a match between the movement of the communication device and the motion signature; and
   communicating, by the authentication computing device, an authentication success message to an issuer of the payment account based on the authentication of the consumer.

2. The computer-implemented method of claim 1, wherein detecting the authorization request from the merchant includes detecting the authorization request form the merchant via an acquirer associated with the merchant; and
   wherein the authentication computing device includes a payment network computing device coupled in communication with a computing device of the acquirer.

3. The computer-implemented method of claim 1, wherein the payment account credential includes a primary account number (PAN).

4. The computer-implemented method of claim 1, wherein authenticating the consumer to the payment account in connection with the transaction includes permitting the transaction to proceed.

5. A non-transitory computer readable storage medium including computer-executable instructions, which when executed by a processor of an authentication computing device, cause the processor to:
   detect an authorization request from a merchant, the authorization request for a transaction by a consumer at the merchant, the transaction directed to a payment account associated with the consumer, the authorization request including a payment account credential for the payment account;
   determine whether at least one of the payment account and/or a communication device is registered, based on the payment account credential in the authorization request;
   in response to i) the detected authorization request and ii) the at least one of the payment account and/or the communication device being registered:
      identify a motion signature previously defined by the consumer, and stored in memory, based on the payment account credential included in the authorization request, the motion signature including multiple movements;
      generate an authentication request for the consumer, the authentication request including instructions to move the communication device associated with the consumer, sequentially, in a manner consistent with the multiple movements of the motion signature; and
      transmit the authentication request to the communication device, whereby the consumer is directed to move the communication device, sequentially, in a manner consistent with the multiple movements of the motion signature;
   receive indication of movement of the communication device, from the communication device, in response to the authentication request, the indication including per unit time values of the movement measured by at least one of a gyro sensor and/or an accelerometer included in the communication device;

compare the movement of the communication device to the motion signature;

authenticate the consumer to the payment account in connection with the transaction, in response to a match between the movement of the communication device and the motion signature; and communicate an authentication success message to an issuer of the payment account based on the authentication of the consumer.

6. The non-transitory computer readable storage medium of claim 5, wherein the computer-executable instructions, when executed by the processor, cause the processor, in detecting the authorization request, to detect the authorization request form the merchant, via an acquirer associated with the merchant; and wherein the authentication computing device includes a payment network computing device coupled in communication with a computing device of the acquirer.

7. The non-transitory computer readable storage medium of claim 5, wherein the payment account credential includes a primary account number (PAN).

8. A system for use in authentication, the system comprising:

a memory comprising a payment account credential for a payment account associated with a consumer; and a processor in communication with the memory and configured to:

detect an authorization request from a merchant, the authorization request for a transaction by the consumer at the merchant, the transaction directed to the payment account associated with the consumer, the authorization request including the payment account credential for the payment account;

determine whether at least one of the payment account and/or a communication device is registered, based on the payment account credential in the authorization request;

in response to i) the detected authorization request and ii) the at least one of the payment account and/or the communication device being registered:

identify a motion signature previously defined by the consumer, and stored in the memory, based on the payment account credential included in the authorization request, the motion signature including multiple movements;

generate an authentication request for the consumer, the authentication request including instructions to move the communication device associated with the consumer, sequentially, in a manner consistent with the multiple movements of the motion signature; and transmit the authentication request to the communication device, whereby the consumer is directed to move the communication device, sequentially, in a manner consistent with the multiple movements of the motion signature; and receive indication of movement of the communication device, from the communication device, in response to the authentication request, the indication including per unit time values of the movement measured by at least one of a gyro sensor and/or an accelerometer included in the communication device;

compare the movement of the communication device to the motion signature;

authenticate the consumer to the payment account in connection with the transaction, in response to a match between the movement of the communication device and the motion signature; and communicate an authentication success message to an issuer of the payment account based on the authentication of the consumer.

9. The system of claim 8, further comprising a payment network associated with the payment account, the payment network including the memory and the processor.

10. The system of claim 8, wherein the processor is configured to detect the authorization request from the merchant, via an acquirer associated with the merchant.

11. The system of claim 8, further comprising the communication device including the at least one of the gyro sensor and/or the accelerometer, wherein the communication device is configured to:

receive the instructions from the processor to move the communication device, sequentially, in the manner consistent with the multiple movements of the motion signature;

display the instructions to the consumer;

detect the movement of the communication device, in response to the instructions, via the at least one of the gyro sensor and/or the accelerometer; and transmit the indication of the movement of the communication device to the processor.

* * * * *